US006290276B1

(12) United States Patent
Sherwin

(10) Patent No.: US 6,290,276 B1
(45) Date of Patent: Sep. 18, 2001

(54) OVERLAPPING SPRING BLADE CUP GRIPPER

(75) Inventor: John P. Sherwin, Wauwatosa, WI (US)

(73) Assignee: ABB Flexible Automation, Inc., New Berlin, WI (US)

( * ) Notice: Subject to any disclaimer, the term of this patent is extended or adjusted under 35 U.S.C. 154(b) by 0 days.

(21) Appl. No.: 09/345,952

(22) Filed: Jul. 1, 1999

(51) Int. Cl.[7] .............................. B25J 15/12; B65G 47/90
(52) U.S. Cl. ......................................... 294/87.1; 294/99.1
(58) Field of Search .................................. 294/50.5, 63.1, 294/81.6, 81.61, 87.1, 87.12, 99.1, 100, 103.1, 110.1; 53/247; 414/729, 751; 901/31, 37–39

(56) References Cited

U.S. PATENT DOCUMENTS

| | | | |
|---|---|---|---|
| 2,561,536 | * | 7/1951 | Rowe ................................. 294/87.1 |
| 2,666,665 | | 1/1954 | Whitcher et al. . |
| 2,707,572 | * | 5/1955 | Rothman ........................ 294/87.1 X |
| 2,805,095 | * | 9/1957 | Cummings et al. ................ 294/87.1 |
| 2,999,604 | | 9/1961 | Chalich . |
| 3,081,124 | * | 3/1963 | Kaplan ............................... 294/87.1 |
| 4,775,046 | | 10/1988 | Gramarossa et al. . |
| 5,178,506 | * | 1/1993 | Meschi ......................... 294/103.1 X |
| 5,328,319 | * | 7/1994 | Fadaie ............................ 294/87.1 X |

* cited by examiner

Primary Examiner—Johnny D. Cherry
(74) Attorney, Agent, or Firm—Godfrey & Kahn, S.C.

(57) ABSTRACT

An end effector for handling stacks of plastic cups, dishes, and similar items. The end effector includes a bracket of similar mechanism for coupling the end effector to the end of a robot arm. A gripping assembly is coupled to the bracket. The gripping assembly includes a main plate with a plurality of pairs of spring blades mounted on the bottom of the main plate. Each spring blade has a plurality of teeth and the pairs of spring blades are positioned such that the teeth from each spring blade are interweaved with one another. Two end blades are also mounted on the bottom of the main plate. The spring blades and end blades form a plurality of parallel bays. Each bay is formed by two spring blades or one spring blade and one end blade. When the end effector is coupled to the robot arm and moved down over the stacks of items to be picked up, the spring blades flex allowing the items to pushed into each bay. The teeth in each spring blade are bent in such a way that as the cups move up into the bay, the teeth move back toward their original position, thereby holding the items in place. To release the items from the bays, a release assembly is driven by an actuator to eject the items from the bays.

8 Claims, 5 Drawing Sheets

OVERLAPPING SPRING BLADE CUP GRIPPER

FIELD OF THE INVENTION

The present invention relates to end effectors used with robots. More specifically, the present invention relates to an end effector having overlapping springs to pick up cups and similar items.

BACKGROUND OF THE INVENTION

Robots carry out tasks with speed, accuracy, and repeatability that can not be matched by manual techniques. They are used in a variety of applications, from welding to picking up and handling all sorts of items. In order to carry out these tasks, robots are equipped with "end effectors," devices designed to effect a desired action. End effectors often take the form of mechanical fingers, claws, or jaws that mechanically compress articles between two members. While these types of end effectors (sometimes called "grippers") are effective for use in industrial environments and to manipulate objects that are hard and relatively heavy, they are not useful for handling lighter, delicate, or easily crushed items.

For example, plastic glasses and cups are difficult to handle using typical robot grippers because they are usually made from materials that can be crushed or broken relatively easily. In addition, cups and glasses are often placed inside one another to create hard-to-handle, large stacks. The stacks can be unstable if they are not grasped along their entire length. It is also difficult to remove and place stacks of items in boxes and similar containers, because the area within such containers is limited and stacks are often surrounded on three sides (either by another stack or a wall of the container). This makes it difficult to grab or grip the stack without damaging the container or other stacks. Another problem with most grippers is that a minimum clearance from items in the operating environment must be provided so that they can properly open and close. Typically, an end effector requires more operating space when its jaws are opened. This makes it difficult to handle items in tight spaces such as occurs when packing or unpacking cups or similar items. Thus, these tasks are often done using manual or semiautomated mechanisms. However, if an end effector existed that could grasp stacks of such items and deliver such items without damage, in the confines of a container, the benefits of robotic automation could be realized.

SUMMARY OF THE INVENTION

Therefore, it is an objective of the present invention to provide a robot end effector that can grasp stacks of cups, glasses, and similar items. This objective and others are achieved in an end effector having a mounting bracket or similar mount designed to be coupled to the arm of a robot. The bracket holds an actuator, which in one embodiment has two guide rods and a piston rod. Also coupled to the actuator is a main plate with a top surface and a bottom surface. The main plate is mounted to the bracket by a plurality of standoff rods and has a number of clearance openings. The main plate supports a plurality of spring blades and two end blades. Each spring blade has a plurality of teeth and the blades are arranged in pairs so that the teeth of each blade in the pair are interweaved with each other. The end blades and pairs of springs are mounted to the bottom side of the main plate and arranged to create a number of bays. A stack of cups may be pushed into and held in each bay.

To release the cups from the bays, the end effector is equipped with an ejection assembly. The ejection assembly has a support plate which is coupled to the guide rods of the actuator as well as the actuator's piston rod. A plurality of extension rods is coupled to the support plate. Each extension rod extends through one of the clearance openings in the main plate and is coupled to one ejector bar. Each ejector bar is positioned in one of the bays formed by the spring blades. The actuator's piston rod drives the support plate between a retracted position and an extended position. In order to eject cups from the bays, the support plate is driven downward by the actuator to the extended position. This motion causes the ejector bars to move downward, contact the stack of cups in each bay, and force the stack from the grip of the spring blades.

Still further objectives and features of the present invention will become apparent by a review of the description below and accompanying drawings.

DETAILED DESCRIPTION

Figure 1:
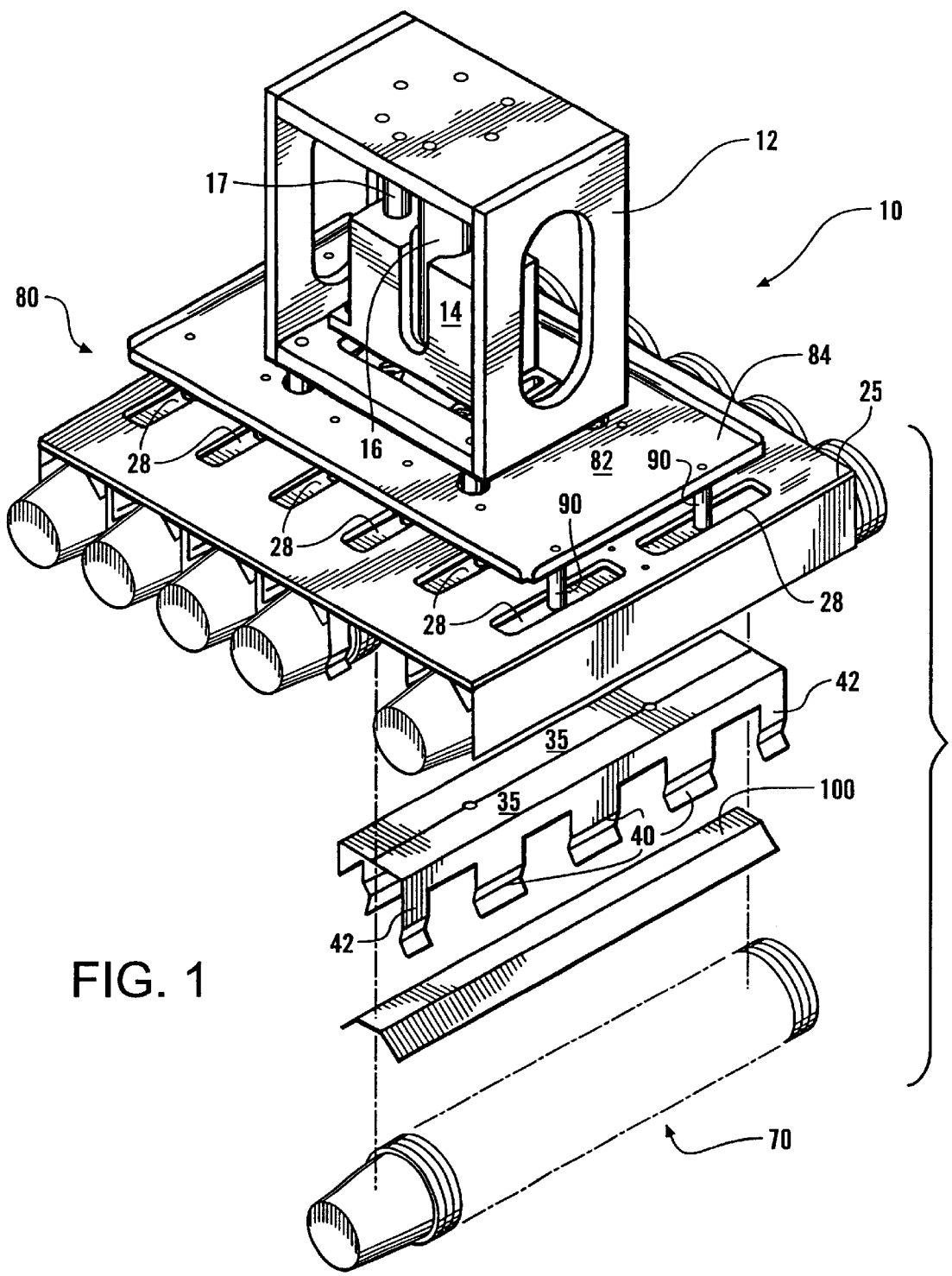
FIG. 1 is a perspective view of an end effector constructed in accordance with the teachings of the present invention.

An end effector 10 constructed in accordance with the present invention is shown in FIG. 1. The end effector 10 includes three main systems or assemblies. An assembly or mechanism for being mounted on or coupled to a robot arm, a housing for holding a plurality of stacks of cups, and an ejector assembly for releasing the stacks of cups from the housing. Each of these assemblies is discussed below.

Numerous devices could be used to couple the end effector 10 to a robot, but in the embodiment shown, a simple mount or bracket 12 is used. Mounted on the bracket 12 is an actuator 14, which may be a linear actuator (such as an air or hydraulic liquid actuator) of conventional design. In the embodiment shown, the actuator includes a main cylinder 16 having a fluid-driven piston (not shown) with a piston rod (also not shown) and two guide rods 17 and 18. The actuator and ejection assembly (discussed below) make up a system for releasing stacks of cups from the ejector 10.

The assembly used to grasp cups includes a housing formed, in part, by a main plate 25 coupled to the bracket 12. The main plate 25 has a top surface 26 and a bottom surface 27, and a number of clearance openings 28. The main plate 25 is coupled to the bracket 12 by a plurality of standoff rods 30. Mounted on the bottom surface 27 of the main plate 25 is a first plurality of spring blades 35, a second plurality of blades 36, and two end blades 37. Each spring blade 35 has three main teeth 40 and two end teeth 42. Each spring blade 36 has four main teeth 40. The tooth width is a function of the desired clamping or spring force, given a constant material thickness and type. The clamping or spring force is also a function of tooth length.

While the main and end teeth are different in size, each tooth 40, 42 shares certain characteristics, which for purposes of brevity will be discussed for only one tooth. As best seen by reference to FIG. 3, each tooth 40, 42 has a relatively straight main portion 45 and a tip portion 47. The tip portion 47 is bent, having a flattened, V-shape in cross-section. As will be further explained below, each tip portion 47 is designed so that cups and similar products with curved surfaces may be pushed past the tip portion 47 when two spring blades 35 and 36 or one spring blade 35/36 and one end blade 37 are positioned opposite one another. The blades may be made from food-grade, stainless steel or spring steel and preferably are made from stainless steel.

Figure 2:
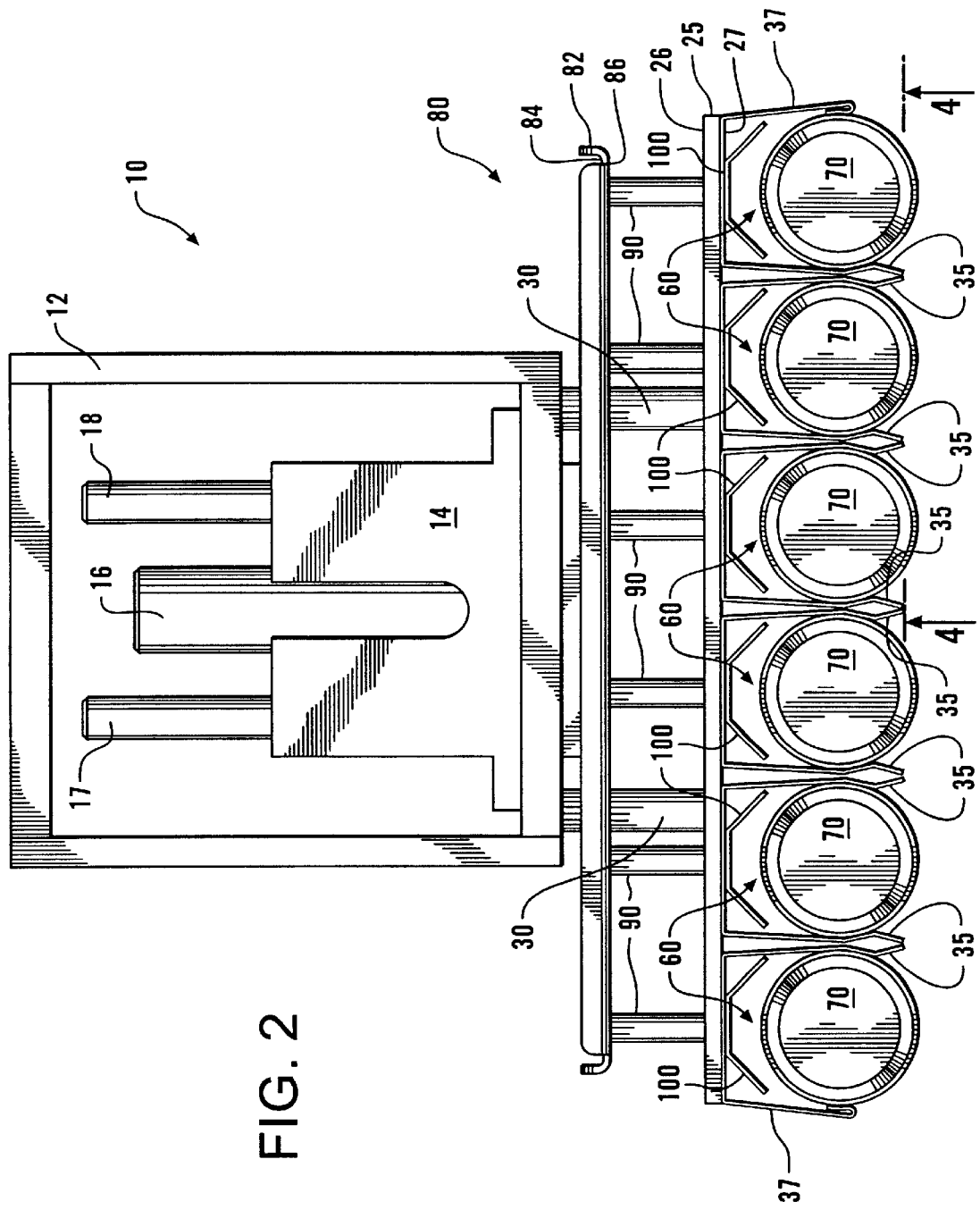
FIG. 2 is a side view of the end effector shown in FIG. 1.
Figure 3:
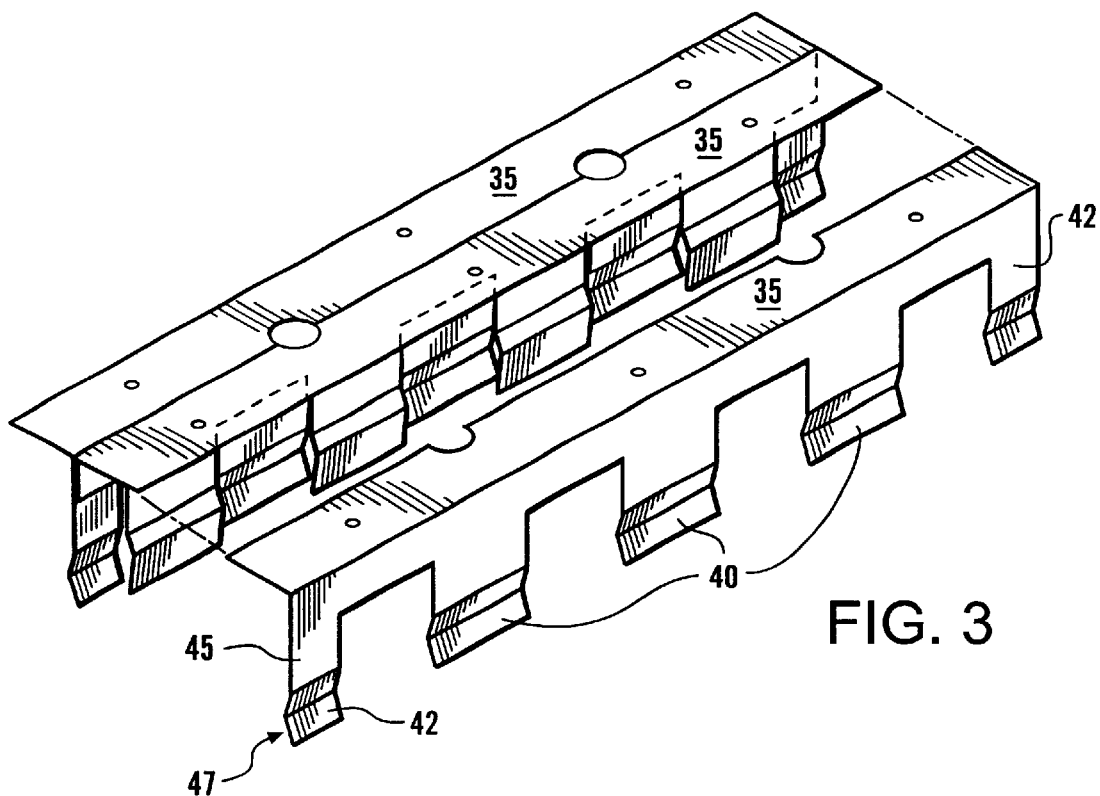
FIG. 3 is a perspective view of the blades used in the end effector of the present invention.
Figure 4:
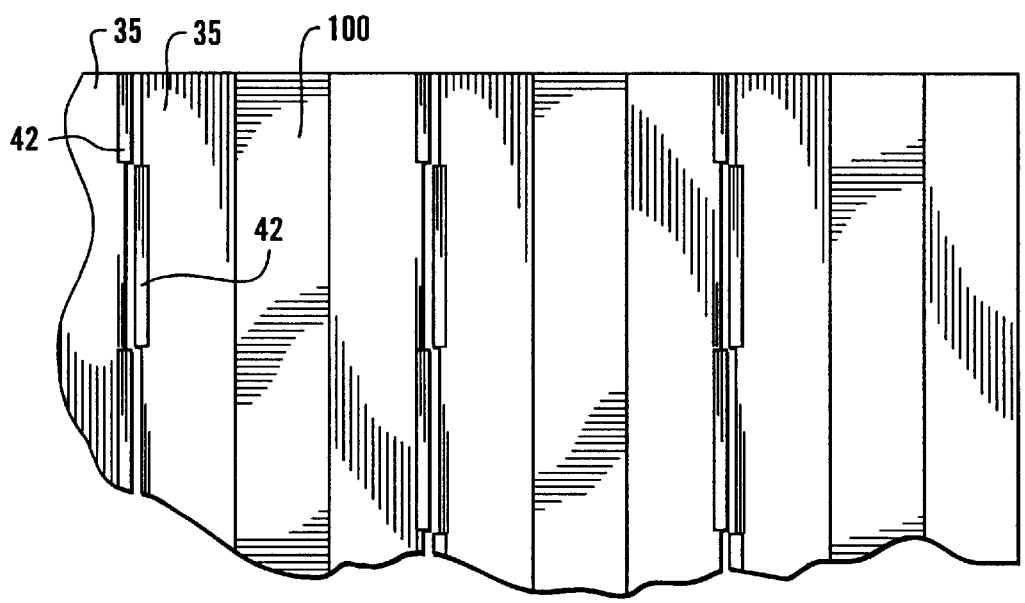
FIG. 4 is a bottom view of the blades used in the end effector taken along the line 4—4 of FIG. 1.
Figure 5:
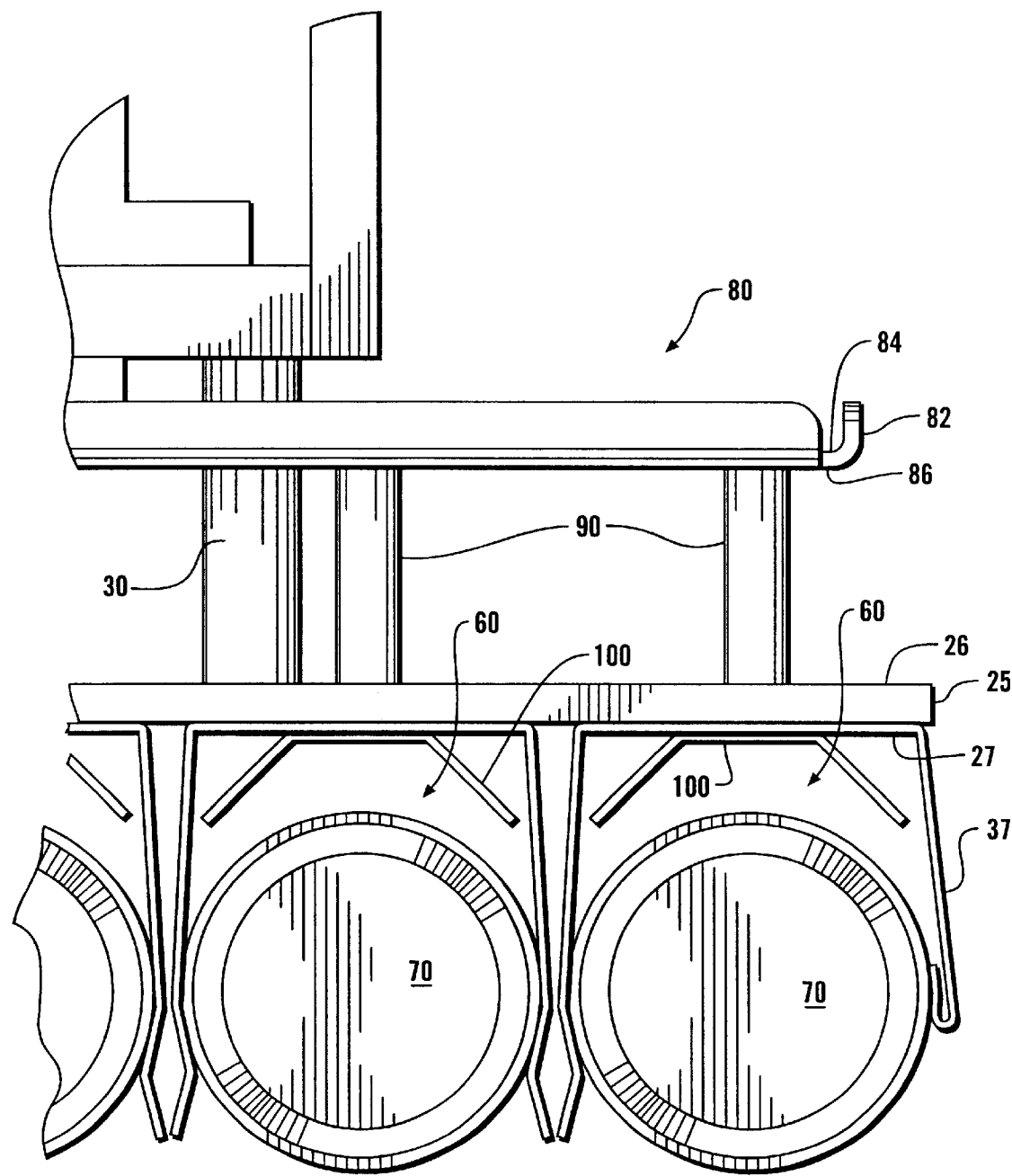
FIG. 5 is a partial, enlarged perspective view of the bays of the end effector of the present invention.

As best seen by reference to FIGS. 2–4, the spring blades 35 and 36 are mounted in pairs on the main plate 25 so that the teeth of each spring blade are interweaved with the teeth on the other spring blade. The end blades 37 and pairs of spring blades 35 and 36 are arranged to create a plurality of bays 60. The embodiment shown has six bays, but the number of bays could be readily changed, if needed. Further, the size of the individual bays could be changed by adjusting the size and position of the spring and end blades used to form the bays 60. The interweaving creates a wedge lead-in, which serves to separate and feed in stacks of cups (discussed below) while the end effector 10 grasps them. The stacks, in turn, with the gripper pushing down, force the spring blades back until each stack seats in each bay, at which time the spring blade snaps back to its original position. (See FIG. 6).

A stack 70 of cups or similar items may be pushed or otherwise forced into and held in each bay 60. For example, when the end effector 10 is mounted on a robot (not shown) it may be positioned over a number of parallel stacks 70 such as might be arranged on a conveyor station (not shown) and moved down over the stacks so that the cups are forced into the bays 60. The stacks 70 would then be moved by the robot to a desired location such as a corrugated container (also not shown) and loaded into the container for shipping.

Figure 6:
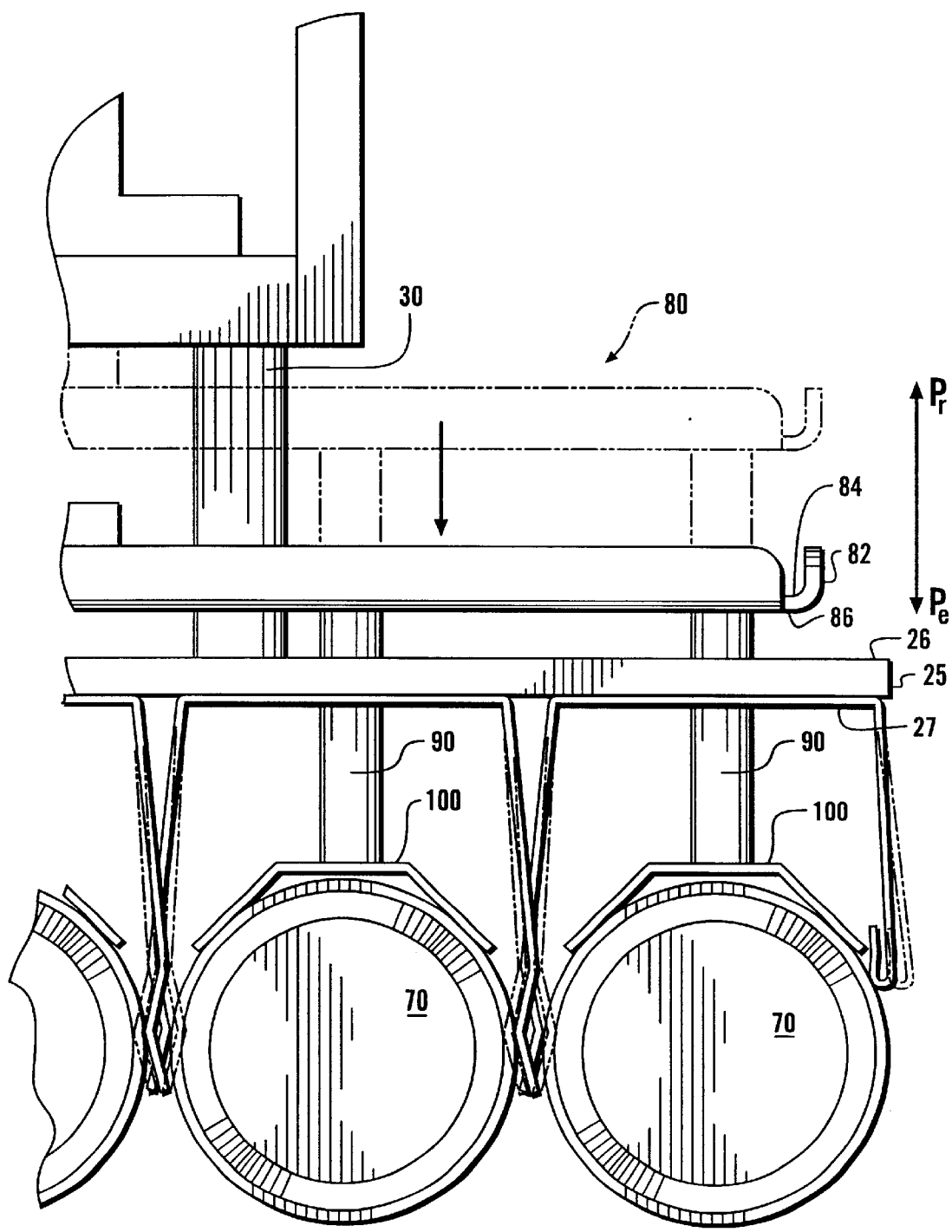
FIG. 6 is a partial, enlarged perspective view of the bays of the end effector of the present invention showing the ejection mechanism in an extended position.

To release the cups from the bays 60, the end effector is equipped with an ejection sub assembly 80. The ejection sub-assembly 80 has an support plate 82 which is coupled to the actuator 14. Specifically, the support plate 82 is coupled to the guide rods 17 and 18 and the piston rod of the actuator 14. The piston rod drives the support plate 82 between a retracted position $P_r$ and an extended position $P_e$ (FIG. 6). The support plate 82 has a first side 84 and a second side 86. A plurality of extension rods 90 is coupled to the second side 86 of the support plate 82. Each extension rod 90 extends through one of the clearance openings 28 in the main plate 25. Each extension rod 90 is coupled to one ejector bar 100. Each ejector bar 100 is positioned in one of the bays 60. In the embodiment shown, each ejector bar 100 has a polygonal shape which approximates an arc. The shape of the ejector bars 100 is designed to match the curvature of cups and similar items. When releasing or unloading a stack 70 of cups from the bays 60 of the end effector 10, the support plate 82 is driven downward by the actuator 14 to the extended position $P_e$. This motion causes the ejector bars 100 to move downward, contact the stack 70 of cups in each bay 60, and force the stacks from the grip of the spring blades 35. Before the end effector is used to grip another set of stacks 70, the support plate is moved back to the position $P_r$.

As can be seen from the above discussion, one of the unique features of the present invention is that it grips easily damaged and hard to handle items such as stacks of plastic cups. In particular, one advantage offered by the present invention is that the gripping mechanism does not require large amounts of space to open and close. Thus, the present invention may operate in confined areas such as within a container or box. Another advantage of the present invention is that it achieves the gripping and release functions with relatively few moving parts and simplicity of design. The invention is versatile as it may be implemented in a number of configurations to accommodate situations where the number and size of stacks varies from what has been shown and discussed. Further, while the present invention may be used to handle plastic cups, other items such disposable plates, bowls, and dishes may be gripped with an end effector constructed according to the teachings presented herein. Thus, the present invention is not limited to the specific details set forth, but embraces all forms that come within the scope of the following claims.

What is claimed is:

1. An end effector comprising:

a bracket capable of being coupled to a robot;

a gripping assembly including at least one bay for holding a desired item, the at least one bay formed at least in part by a spring blade;

a linear actuator coupled to the bracket; and a release assembly coupled to the actuator, the release assembly having an ejector mechanism coupled to the linear actuator and positioned in the bay.

2. An end effector comprising:

a bracket capable of being coupled to a robot;

a gripping assembly coupled to the bracket; the gripping assembly including a plurality of bays for holding a desired item, and at least one pair of spring blades, each spring blade having a plurality of teeth, and positioned such that the teeth from each blade are interweaved with the teeth from another spring blade;

an actuator coupled to the bracket; and a release assembly coupled to the actuator, the release assembly having a support plate coupled to the actuator, and a plurality of ejector bars, each ejector bar coupled to the support plate and individually positioned within one of the bays of the gripping assembly.

3. The end effector as in claim 2, wherein one blade in the pair of blades has two end teeth and three main teeth and the other blade in the pair of blades has four main teeth.

4. The end effector as in claim 2, wherein each tooth has a main portion and a V-shaped tip portion.

5. The end effector as in claim 2, wherein the gripping assembly further comprises two end blades.

6. An end effector comprising:

a bracket capable of being coupled to a robot;

a gripping assembly coupled to the bracket; the gripping assembly including a main plate with a bottom;

a plurality of pairs of spring blades mounted on the bottom of the main plate, each spring blade having a plurality of teeth, the spring blades positioned such that the teeth from each spring blade are interweaved with one another;

two end blades mounted on the bottom of the main plate;

a plurality of bays, each bay formed by two spring blades or one spring blade and one end blade;

an actuator coupled to the bracket; and a release assembly coupled to the actuator, the release assembly having a support plate coupled to the actuator, and a plurality of ejector bars, each ejector bar coupled to the support plate and individually positioned within one of the bays of the gripping assembly.

7. The end effector as in claim 6, wherein one blade in each pair of blades has two end teeth and three main teeth and the other blade in the pair of blades has four main teeth.

8. The end effector as in claim 7, wherein each tooth has a main portion and a V-shaped tip portion.

* * * * *